Figure 1:
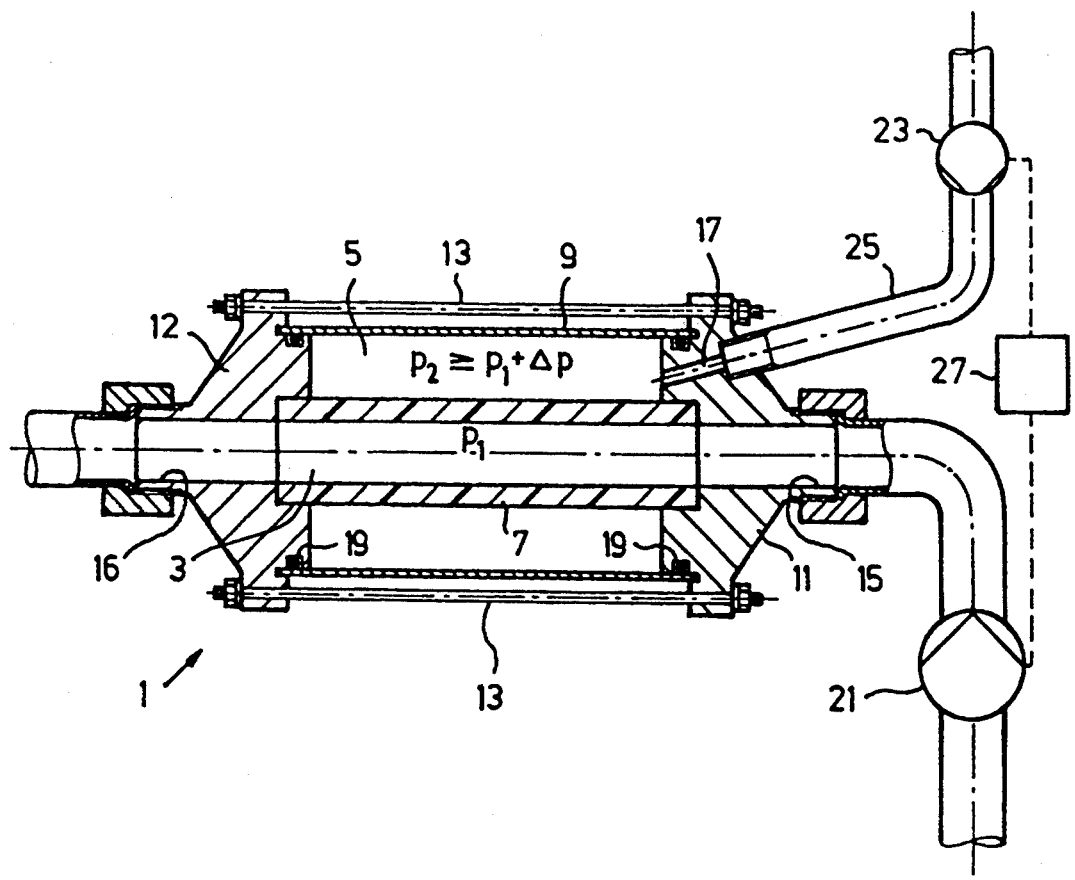

United States Patent [19]
Kleen et al.

[11] Patent Number: 5,451,104
[45] Date of Patent: Sep. 19, 1995

[54] METHOD AND APPARATUS FOR PRODUCING FOAM

[75] Inventors: Eugen Kleen, Bottrop; Claus-Michael Müller, Essen, both of Germany

[73] Assignee: CRC-Chemical Research Company Ltd., Killycard, Ireland

[21] Appl. No.: 190,036

[22] PCT Filed: Aug. 6, 1992

[86] PCT No.: PCT/EP92/01778
§ 371 Date: Jan. 28, 1994
§ 102(e) Date: Jan. 28, 1994

[87] PCT Pub. No.: WO93/02783
PCT Pub. Date: Feb. 18, 1993

[30] Foreign Application Priority Data
Aug. 9, 1991 [DE] Germany .................. 41 26 397.9

[51] Int. Cl.[6] .............. B28C 5/06; B01F 13/02
[52] U.S. Cl. ........................ 366/3; 366/101; 422/133
[58] Field of Search ............ 366/101, 106, 107, 3, 366/5, 10, 11; 261/DIG. 26, DIG. 28; 422/131, 133

[56] References Cited
U.S. PATENT DOCUMENTS

| | | | |
|---|---|---|---|
| 2,615,693 | 10/1952 | Matirko | 366/11 |
| 4,674,888 | 6/1987 | Carlson | 366/101 |
| 5,035,842 | 7/1991 | Mohn | 366/101 |
| 5,055,272 | 10/1991 | Wheeler | 261/DIG. 26 |

*Primary Examiner*—Robert W. Jenkins
*Attorney, Agent, or Firm*—Blakely, Sokoloff, Taylor & Zafman

[57] ABSTRACT

A mixing chamber (3) and a gas inlet chamber (5) are concentrically arranged in a closed housing (1) and divided from one another by a tubular partition wall (7) provided with micropores. A flow of a liquid, foamable medium is introduced by a pump (21) axially into the mixing chamber (3). At the same time, air produced by a compressor (23) is introduced via a housing inlet (17) into the gas inlet chamber (5) under such a pressure that the air can penetrate through the micropores in the tubular partition wall (7) into the mixing chamber (3). The partition wall (7) surrounding the mixing chamber and the peripheral wall (9) are replaceably mounted between two flanges (11 and 12). The cross-sectional profile of the axial inlet and outlet (15 and 16) is matched to the cylindrical cross-section of the mixing chamber (3) so that in operation a laminar flow of the foam mixture substantially parallel to the axis occurs through the mixing chamber (3).

17 Claims, 1 Drawing Sheet

METHOD AND APPARATUS FOR PRODUCING FOAM

The invention relates to a method of producing foam in accordance with the precharacterising portion of claim 1. The invention further relates to a foam generator in accordance with the precharacterising portion of claim 1.

Foam was previously produced principally by mechanical mixing. It is known from DE-C-3631221 C1 to form a foam from a foamer and water and to mix successively a hydraulic bonding agent, e.g. cement and a pulverulent mineral material into this foam. When the foam mass is loaded with the bonding agent at the time when the main component is mixed in, namely the pulverulent mineral solid material, there is the danger of void formation. The resulting foam can therefore no longer be simply further processed. It is also known to intimately mix a finished foam with different pulverulent mineral materials and then to put both foam mixtures together and again to mix them mechanically into a foamed building material (EP-A 0299482). Only those materials which have relatively long pot and processing times (>30 seconds) can be foamed with these known mechanical foam producing methods. These include filling foams in mining and slowly setting repair and insulating mortars.

There are also methods for foam production in which the foam is produced by a chemical reaction. These include the production of polyurethane foam in which the foamable medium reacts with water or moisture in the air. Finally, there are also methods of foam production by propellant gas in which propellant gas is initially mixed in liquid form into the medium to be foamed and the foam is produced subsequently by transition of the propellant gas from the liquid into the gaseous phase.

A method and an apparatus of the type referred to above are known from EP-A-0 288 106. In this, foamable cement slurry is deflected within the mixing chamber whilst simultaneously nitrogen is injected into the deflection region. The cement foam is subsequently introduced into bores in the earth. It has been found that this technology needs to be improved, particularly with regard to the processing of different materials.

It is the object of the invention to make a method and a generator for producing foam available which have a previously unachieved range of use whilst including bonding agents with extremely short pot and processing times and may be matched to the different uses with small expense.

In order to solve this object the method in accordance with the invention has the features in the characterising portion of claim 1 whilst the foam generator in accordance with the invention is distinguished by the characterising features of claim 11.

A substantial advantage of the invention by comparison with conventional foam producing methods and apparatus resides in that any gas, thus even air, $CO_2$, steam or also any other desired gas mixture can be used in the production of foam. The same applies also to the foamable, liquid or pasty medium. The pneumatic production of foam in the mixing chamber takes place continuously and, thanks to the laminar flow and the uniform porosity of the partition wall, so uniformly and rapidly that the finished foam is produced directly after the liquid or pasty foamable component is brought together with the gaseous medium responsible for the foaming. The invention may thus be used also on those foamable media which previously appeared unsuitable for the production of foam due to their short pot and processing times (<30 seconds).

The introduction of the gaseous medium into the mixing chamber through a partition wall traversed by numerous micropores is responsible in an advantageous manner for an optimum distribution of the foam bubbles in the foam. With a uniform size of the micropores in the partition wall a uniform air bubble or pore size in the finished foam is also ensured. This uniform air pore size may be preset in accordance with a further embodiment of the invention by a suitable choice of the micropores in the porous partition wall, which is preferably of tube or pipe shape. In an advantageous embodiment of the invention the air bubble size in the finished foam (outside the foam generator) may be controlled during operation itself due to the fact that the relative flow rates of the foamable and gaseous media are controlled. By altering the ratio of the amounts of gas and liquid introduced per unit time into the mixing chamber, the proportion of pores and thus the density (weight) of the finished foam may be varied.

The possibility of processing even rapidly setting materials opens up new and important areas of use to the method of foam production in accordance with the invention and the associated foam generator. Above all, in the building sector in the field of light mortars, light plasters, foam concretes and reaction resins, moulded members may be produced in situ which permit considerable savings to be expected due to their low weight. The invention may, however, also be used without limitation for filling duties in mining and for special foaming duties, such as the application of repair mortars, thermal insulation mortars, sound protective mortars, building materials with sound-inhibiting properties, plasters, machine plasters, insulating mortars and anhydrite bonding agents and finally for acid protection duties. The invention is, however, also suitable for extinguishing purposes, whereby air or carbon dioxide is introduced in the mixing chamber into a tenside-containing continuous flow of water.

In order to maintain the substantially laminar flow of the foamable medium into the mixing chamber during the foam production for the purpose 0f uniform foaming and distribution of the air pores in the foam, the foam generator has a substantially cylindrical housing in which the mixing and gas inlet chambers are arranged concentrically. The porous partition wall defining the mixing chamber is preferably a tube or pipe-shaped moulded plastics member in which micropores exposing radial passageways with a pore size between 5 and 500 $\mu$m, particularly between 10 and 250 $\mu$m, are constructed.

In addition to the particularly simply constructed cylindrical construction of the housing with a concentric arrangement of the mixing and gas inlet chambers, other housing constructions are, however, also possible, such as multiple chamber systems with a plurality of parallel mixing chambers which pass through a common gas inlet chamber and are defined by respective suitable porous moulded plastics members as partition walls; a simple somewhat less effective construction is the arrangement of the mixing and gas inlet chambers next to one another with a substantially flat porous partition wall.

Convenient developments and advantageous embodiments of the invention are characterised in the dependent claims.

The invention will be explained below in more detail with reference to an exemplary embodiment which is illustrated schematically in the drawing.

FIG. 1 shows the important components—partly in section and partly in the form of a block circuit diagram—of an exemplary embodiment of the foam generator in accordance with the invention.

The important components of the new foam generator are illustrated in FIG. 1. The core of the foam generator is a foam head with a housing 1 in which are disposed a cylindrical mixing chamber 3 and a gas inlet chamber 5 arranged concentrically with the mixing chamber 3. The mixing chamber and the gas inlet chamber are separated by a tube or pipe-like partition wall 7. The partition wall 7 comprises a tubular moulded plastics member which is provided, at least in the radial direction, with micropores. The pore size of the partition wall 7 depends on the application; for other purposes there are tubular or pipe-shaped moulded plastics members of the type used in the invention with pore sizes between about 5 and 250 $\mu$m. The size of the pores is, however, not critical in the invention. A uniform pore size and a uniform distribution of the pores over the length and the periphery of the tubular or pipe-shaped moulded plastics member 7 are advantageous.

The gas inlet chamber 5 is defined externally by a cylindrical peripheral wall 9. The walls 7 and 9 defining the chambers 3 and 5 are releasably secured between two flanges 11 and 12. The flanges 11 and 12 can be axially drawn apart after releasing fastening bolts 13, whereby the cylindrical walls 7 and 9, which are trapped in suitable grooves in the two flanges, and also the mixing and gas inlet chambers 3 and 5 can be exposed. The two flanges 11 and 12 are provided with short axial passages 15 and 16, whose opening cross-sections are precisely matched to that of the mixing chamber 3.

In the described embodiment the flange 11 has an inlet 17 through which the gaseous medium, particularly air, is introduced into the gas inlet chamber 5. Annular grooves 19 for receiving O rings serving as sealing elements are formed in both flanges 11 and 12. The substantially gas tight seal of the housing 1 between the gas inlet chamber 5 and the atmosphere is to be produced with the aid of the annular seals. This gas seal is however not critical since the gas supply necessary for the foam production is effected continuously via the inlet 17 into the gas inlet chamber, whereby any leakage flows can be compensated for without difficulty.

A suitable foamable, preferably liquid but optionally also pasty, medium is forced with the aid of the pump 21 into the short inlet passage 15. At the same time a gas required for foaming, for instance air, is forced with the aid of a compressor 23 into the gas inlet 17 via the conduit 25. The outputs of the pump 21 and the compressor 23 are so adjusted by means of a controller 27, whose measured values are supplied by a suitable measuring arrangement which is not shown in the drawing, that a pressure $p_1$ prevails in the mixing chamber 3 which is lower than the pressure $p_2$ in the gas inlet chamber 5 surrounding the mixing chamber by at least the pressure differential $\Delta p$. Due to this pressure drop $\Delta p$ a medium exchange is possible, basically only from the gas inlet chamber 5 in the direction of the mixing chamber 3. Penetration of the generally liquid, foamable medium out of the mixing chamber 3 in the direction of the gas inlet chamber 5 would have the disadvantageous effect that the foamable medium blocks the micropores in the tubular partition wall 3 to a greater or lesser extent and thus impairs the function of the foam generator.

When the predetermined pressure gradient $\Delta p$ is maintained, the delivery rates of the transfer devices 21 and 23 may be varied relative to one another such that the air bubble size.

We claim:

1. A method of producing foam comprising the steps of:
    a) transferring a foamable medium into a mixing chamber (3),
    b) passing the foamable medium past a porous mixing chamber partition wall (7),
    c) mixing the foamable medium with a gaseous medium, wherein the gaseous medium is introduced uniformly and distributed through the porous partition wall (7),
    d) discharging the medium from the mixing chamber (3),
    e) maintaining a pressure differential between the two sides of the porous partition wall (7), ensure the transfer of gas into the mixing chamber (3) and prevent the penetration of the foamable medium into the pores of the partition wall, and
    f) maintaining a substantially laminar flow of the foamable medium in the mixing chamber (3) during the foam production.

2. The method as claimed in claim 1, further comprising the steps of: guiding the flow of the foamable medium substantially axially through the mixing chamber (3), and introducing the gaseous medium into the mixing chamber (3) approximately transversely to the mixing chamber.

3. The method as claimed in claims 1 or 2, further comprising the step of controlling the bubble size in the foam is by varying the relative flow rates of the foamable and gaseous media.

4. The method as claimed in claims 1 or 2, wherein the gas bubble size in the foam is preset by selection of the size of the micropores in the mixing chamber partition wall (7).

5. Method as claimed in claim 1 wherein the gaseous medium at least one of air, $Co_2$ and steam.

6. Method as claimed in claim 1 wherein the foamable medium includes at least one minerally bonding, setting material.

7. Method as claimed in claim 6, wherein a surface active substance including cement glue, cement mortar, cement concrete, anhydrite bonding agent, lime mortar, magnesite bonding agent and/or minerally setting materials is added to a mixing liquid before the mixing liquid is introduced as the foamable medium into the mixing chamber (3).

8. Method as claimed in claim 6 or 7, wherein a light mortar or an insulating mortar is mixed in the mixing chamber (3) with the gaseous medium.

9. Method as claimed in claim 1 wherein the foamable medium includes at least one organically bonding material.

10. Method as claimed in claim 1 wherein the foamable medium includes water and a tenside.

11. A foam generator for producing foam from a foamable medium and a gaseous medium comprising: a mixing chamber (3), a first transfer device (23) coupled to the mixing chamber for selectively transporting the gaseous medium to the mixing chamber, a second transfer device (21) coupled to the mixing chamber for selectively transporting the formable medium to the mixing chamber, a gas inlet chamber (5) coupled to the mixing chamber (3) and the first transfer device for allowing gas to pass from the first transfer device to the mixing chamber, a porous partition wall (7) having pores with a substantially uniform pore size coupled to the mixing chamber and the gas inlet chamber, and a differential pressure setter (27) coupled to the first and second transfer devices for controlling the first and second transfer devices and for ensuring the passage of the gas through the pores of the partition wall (7) into the mixing chamber (3), wherein the differential pressure setter maintains a predetermined pressure gradient ($\Delta p$) between the gas inlet chamber (5) and mixing chamber (3) during foam production, wherein the mixing chamber (3) is surrounded by the porous partition wall (7), wherein the inlet and outlet (15, 16) of the foam-forming medium are arranged axially at opposed end faces of the mixing chamber and, wherein the flow cross-section of the inlet (15) through the mixing chamber (3) to the outlet (16) is substantially constant.

12. The foam generator as claimed in claim 11, wherein the mixing and gas inlet chambers are concentric chambers (3,5) housed in a sealed housing (1).

13. The foam generator as claimed in claim 12 wherein the housing (1) has a peripheral wall (9) concentrically surrounding the gas inlet chamber (5) and two flanges (11, 12) between which the porous partition wall (7) and the peripheral wall (9) are detachably mounted, wherein the flanges have short axial passages (15, 16) whose opening cross-sections are matched to that of the mixing chamber (3).

14. The foam generator as claimed in claim 13, wherein the peripheral wall (9) includes a transparent, clear material.

15. The foam generator as claimed in claim 11 or 12, wherein the porous partition wall (7) is a tube or a pipe-shaped molded plastics member having approximately radially extending micropores with a pore size between 5 and 500 $\mu$m.

16. The foam generator as claimed in claim 11, wherein the first transfer device includes a first means for controlling the amount of air supplied to the gas inlet chamber (5), wherein the second transfer device includes a second means for controlling the amount of the foamable medium transferred into the mixing chamber (3).

17. The foam generator as claimed in claim 16, wherein the second transfer device includes a pump (21) coupled to the mixing chamber for transferring the formable medium into the mixing chamber (3) with a controllable transfer capacity and the first transfer device includes a compressor (23) coupled to the gas inlet chamber (5) with a controllable compressor capacity.

* * * * *

UNITED STATES PATENT AND TRADEMARK OFFICE
CERTIFICATE OF CORRECTION

PATENT NO. : 5,451,104
DATED : September 19, 1995
INVENTOR(S) : Kleen et al.

It is certified that error appears in the above-indentified patent and that said Letters Patent is hereby corrected as shown below:

On the title page item,

[22] PCT Filed change "Aug. 6, 1992" to --Aug. 5, 1992--.

Signed and Sealed this

Fifth Day of March, 1996

Attest:

BRUCE LEHMAN

Attesting Officer

Commissioner of Patents and Trademarks